(12) United States Patent
Nagao

(10) Patent No.: US 11,168,187 B2
(45) Date of Patent: Nov. 9, 2021

(54) FIBER SIZING AGENT, FIBER MATERIAL, MOLDING MATERIAL AND MOLDING

(71) Applicant: DIC Corporation, Tokyo (JP)

(72) Inventor: Kenji Nagao, Osaka (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 16/612,104

(22) PCT Filed: May 8, 2018

(86) PCT No.: PCT/JP2018/017722
§ 371 (c)(1),
(2) Date: Nov. 8, 2019

(87) PCT Pub. No.: WO2018/216457
PCT Pub. Date: Nov. 29, 2018

(65) Prior Publication Data
US 2020/0115514 A1      Apr. 16, 2020

(30) Foreign Application Priority Data

May 26, 2017  (JP) .............................. JP2017-104603

(51) Int. Cl.
*C08J 5/06*       (2006.01)
*C08J 5/04*       (2006.01)
*C08J 5/24*       (2006.01)
*D06M 15/263*   (2006.01)
*D06M 15/564*   (2006.01)
*D06M 101/40*   (2006.01)

(52) U.S. Cl.
CPC ................ *C08J 5/06* (2013.01); *C08J 5/042* (2013.01); *C08J 5/24* (2013.01); *D06M 15/263* (2013.01); *D06M 15/564* (2013.01); *C08J 2333/14* (2013.01); *D06M 2101/40* (2013.01)

(58) Field of Classification Search
CPC ........................................................ C08J 5/06
See application file for complete search history.

(56) References Cited

U.S. PATENT DOCUMENTS

| | | | |
|---|---|---|---|
| 2016/0102180 A1* | 4/2016 | Vautard | D06M 15/273 525/111 |
| 2019/0249358 A1* | 8/2019 | Kaneta | D06M 15/507 |

FOREIGN PATENT DOCUMENTS

| | | |
|---|---|---|
| JP | 2005-213463 A | 8/2005 |
| JP | 2009-35587 A | 2/2009 |
| JP | 2011-006833 A | 1/2011 |
| JP | 2015-7300 A | 1/2015 |
| JP | 2015-175065 A | 10/2015 |
| JP | 2016-160567 A | 9/2016 |
| JP | 2016-196711 A | 11/2016 |

OTHER PUBLICATIONS

International Search Report and Written Opinion issued in corresponding International Application No. PCT/JP2018/017722, dated Jul. 24, 2018, with English translation of the International Search Report.

* cited by examiner

*Primary Examiner* — Megan McCulley
(74) *Attorney, Agent, or Firm* — McDermott Will & Emery LLP

(57) ABSTRACT

A fiber sizing agent includes: a vinyl ester resin (A) having an alkoxy polyoxyalkylene structure and a urethane bond; and an aqueous medium. The fiber sizing agent has excellent fiber sizing properties for various fibers such as glass fibers and carbon fibers. A molded article obtained from a molding material including the fiber sizing agent is excellent in various physical properties such as bending strength, compressive strength, and interlaminar shear strength, and thus can be used, for example, for an automobile member, an aircraft member, a windmill member, and an industrial member.

8 Claims, No Drawings

FIBER SIZING AGENT, FIBER MATERIAL, MOLDING MATERIAL AND MOLDING

CROSS REFERENCE

This patent application is the U.S. National Phase under 35 U.S.C. § 371 of International Application No. PCT/JP2018/017722, filed on May 8, 2018, which claims the benefit of Japanese Patent Application No. 2017-104603, filed on May 26, 2017, the entire contents of each are hereby incorporated by reference.

TECHNICAL FIELD

The present invention relates to a fiber sizing agent useful for fiber sizing and also relates to a fiber material, a molding material, and a molded article.

BACKGROUND ART

As automotive parts and aircraft parts that require high strength and excellent durability, for example, a matrix resin such as an epoxy resin and a vinyl ester resin (epoxy acrylate) and fiber reinforced plastics including glass fibers and carbon fibers are used.

As the glass fibers or the carbon fibers used for the fiber reinforced plastics, generally, in view of imparting high strength, a fiber material bundled to about several thousands to several tens of thousands by a fiber sizing agent is used in many cases.

As the fiber sizing agent, for example, a fiber sizing agent including an aliphatic epoxy compound and a compound having a terminal unsaturated group and a polar group in one molecule is known (for example, see Patent Document 1). However, this fiber sizing agent has a problem in that the sizing properties of carbon fibers are insufficient, and the strength of a molding obtained from a molding material including carbon fibers treated with this fiber sizing agent is also insufficient.

CITATION LIST

Patent Literature

PTL 1: JP-A-2015-7300

SUMMARY OF INVENTION

Technical Problem

The problem to be solved by the present invention is to provide a fiber sizing agent, a fiber material, and a molding material that are excellent in fiber sizing properties and can form a molded article having various excellent physical properties such as bending strength, compressive strength, and interlaminar shear strength, and to provide a molded article therefrom.

Solution to Problem

As a result of research in order to solve the above problems, the present inventors have found that the above problems can be solved by using a fiber sizing agent containing a vinyl ester resin having a specific structure and an aqueous medium to complete the present invention.

That is, the present invention relates to a fiber sizing agent containing a vinyl ester resin (A) having an alkoxy polyoxyalkylene structure and a urethane bond, and an aqueous medium.

Advantageous Effects of Invention

The fiber sizing agent of the present invention can be used for the manufacturing of fiber materials capable of imparting excellent strength to a molded article and has excellent fiber sizing properties, so as to be suitably used as a sizing agent for glass fibers, carbon fibers and the like.

DESCRIPTION OF EMBODIMENTS

The fiber sizing agent of the present invention contains a vinyl ester resin (A) having an alkoxy polyoxyalkylene structure and a urethane bond, and an aqueous medium.

The vinyl ester resin (A) is described. The vinyl ester resin (A) has an alkoxy polyoxyalkylene structure, and the alkoxy polyoxyalkylene structure is a structure in which one end of a polyoxyalkylene chain is blocked with an alkoxy group.

Examples of the polyoxyalkylene chain include a polyoxyethylene chain, a polyoxypropylene chain, a polyoxybutylene chain, and the like, and include the polyoxyalkylene chain obtained by arranging these in a block shape or a random shape.

Examples of the alkoxy group that blocks the end of the polyoxyalkylene chain include a methoxy group, an ethoxy group, a propoxy group, and a butoxy group.

The alkoxy polyoxyalkylene structure preferably has 35% by mass or more of a structure including oxyethylene units because the water dispersibility is further improved.

The alkoxy polyoxyalkylene structure preferably has a number average molecular weight of 300 to 7,000 because water dispersibility is further improved.

The alkoxy polyoxyalkylene structure is included in the vinyl ester resin (A) preferably in the range of 3% to 60% by mass and more preferably in the range of 10% to 55% by mass because the water dispersibility is further improved.

The vinyl ester resin (A) has a (meth)acryloyl group at the terminal. In view of obtaining a molded article with improved sizing properties and higher strength, the (meth)acryloyl equivalent is preferably in the range of 500 to 3,000 g/equivalent and more preferably in the range of 800 to 2,000 g/equivalent.

In the present invention, "(meth)acryloyl" refers to either or both of acryloyl and methacryloyl, "(meth)acrylic acid" refers to either or both of acrylic acid and methacrylic acid, "(meth)acrylate" refers to either or both of acrylate and methacrylate, and "acid (anhydride)" refers to either or both of acid and acid anhydride.

In view of obtaining a molded article with improved sizing properties and higher strength, the vinyl ester resin (A) preferably has a structure derived from a bisphenol A type epoxy resin.

For example, the vinyl ester resin (A) can be obtained by reacting a urethane resin (a1) having an alkoxy polyoxyalkylene structure and an epoxy group with (meth)acrylic acid and/or (meth)acrylic anhydride (a2).

The reaction between the epoxy group included in the urethane resin (a1) and the (meth)acrylic acid and/or (meth)acrylic anhydride (a2) is preferably performed at 60° C. to 140° C. by using an esterified catalyst. A polymerization inhibitor and the like can also be used.

The urethane resin (a1) has an epoxy group. In view of obtaining a molded article with improved sizing properties and higher strength, the epoxy equivalent of the urethane resin (a1) is preferably in the range of 250 to 2,000 g/equivalent.

For example, the urethane resin (a1) can be manufactured by reacting a compound (a1-1) having an epoxy group and a hydroxyl group, polyisocyanate (a1-2), polyoxyalkylene monoalkyl ether (a1-3), and if necessary, polyol (a1-4) other than the compound (a1-1) and a chain extender (a1-5) by a method known in the related art, in the absence of a solvent or in the presence of an organic solvent. Specifically, in view of safety, the reaction is preferably performed at a reaction temperature of 50° C. to 120° C. for 1 to 15 hours.

As the compound (a1-1) having an epoxy group and a hydroxyl group, for example, an epoxy resin having a hydroxyl group can be used.

Examples of the epoxy resin include a cresol novolak type epoxy resin such as a bisphenol A type epoxy resin, a bisphenol F type epoxy resin, a phenol novolak type epoxy resin, an ethylphenol novolak type epoxy resin, a butylphenol novolak type epoxy resin, an octylphenol novolak type epoxy resin, and an orthocresol novolak type epoxy resin, a resorcinol novolak type epoxy resin, a bisphenol A novolak type epoxy resin, a bisphenol F novolak type epoxy resin, a bisphenol AD novolak type epoxy resin, and a bisphenol S novolak type epoxy resin. In view of obtaining a molded article with improved sizing properties and higher strength, a phenol novolak type epoxy resin, a cresol novolak type epoxy resin, or a bisphenol A type epoxy resin is preferable, and a bisphenol A type epoxy resin is more preferable. These epoxy resins can be used singly or two or more kinds thereof may be used in combination.

As the compound (a1-1), a phenol novolak type epoxy resin having a hydroxyl group, a cresol novolak type epoxy resin having a hydroxyl group, or a bisphenol A type epoxy resin having a hydroxyl group is preferably used. In view of obtaining a molded article with improved sizing properties and higher strength, the bisphenol A type epoxy resin having a hydroxyl group is more preferable.

As the compound (a1-1), a compound having an epoxy equivalent of 150 to 2,000 g/equivalent is preferably used, a compound having an epoxy equivalent of 150 to 900 g/equivalent is more preferably used, and a compound having an epoxy equivalent of 150 to 500 g/equivalent is even more preferably used.

In view of obtaining a molded article with improved sizing properties and higher strength, the hydroxyl group included in the compound (a1-1) is included preferably in the range of 5 to 150 mol %, more preferably in the range of 5 to 130 mol %, and even more preferably in the range of 5 to 120 mol % with respect to the total amount of the epoxy groups included in the urethane resin (A).

Examples of the polyisocyanate (a1-2) include aromatic polyisocyanates such as 1,3- and 1,4-phenylene diisocyanate, 1-methyl-2,4-phenylene diisocyanate (2,4-TDI), 1-methyl-2,6-phenylene diisocyanate (2,6-TDI), 1-methyl-2,5-phenylene diisocyanate, 1-methyl-2,6-phenylene diisocyanate, 1-methyl-3,5-phenylene diisocyanate, 1-ethyl-2,4-phenylene diisocyanate, 1-isopropyl-2,4-phenylene diisocyanate, 1,3-dimethyl-2,4-phenylene diisocyanate, 1,3-dimethyl-4,6-phenylene diisocyanate, 1,4-dimethyl-2,5-phenylene diisocyanate, diethylbenzene diisocyanate, diisopropylbenzene diisocyanate, 1-methyl-3,5-diethylbenzene diisocyanate, 3-methyl-1,5-diethylbenzene-2,4-diisocyanate, 1,3,5-triethylbenzene-2,4-diisocyanate, naphthalene-1,4-diisocyanate, naphthalene-1,5-diisocyanate 1-methyl-naphthalene-1,5-diisocyanate, naphthalene-2,6-diisocyanate, naphthalene-2,7-diisocyanate, 1,1-dinaphthyl-2,2'-diisocyanate, biphenyl-2,4'-diisocyanate, biphenyl-4,4'-diisocyanate, 3-3'-dimethylbiphenyl-4,4'-diisocyanate, diphenylmethane-4,4'-diisocyanate, diphenylmethane-2,2'-diisocyanate, and diphenylmethane-2,4-diisocyanate; aliphatic polyisocyanate such as tetramethylene diisocyanate, 1,6-hexamethylene diisocyanate (HDI), dodecamethylene diisocyanate, trimethylhexamethylene diisocyanate, and lysine diisocyanate; alicyclic polyisocyanate such as 1,3-cyclopentylene diisocyanate, 1,3-cyclohexylene diisocyanate, 1,4-cyclohexylene diisocyanate, 1,3-di(isocyanatemethyl) cyclohexane, 1,4-di(isocyanatemethyl) cyclohexane, isophorone diisocyanate (IPDI), 4,4'-dicyclohexylmethane diisocyanate, 2,4'-dicyclohexylmethane diisocyanate, 2,2'-dicyclohexylmethane diisocyanate, and 3,3'-dimethyl-4,4'-dicyclohexylmethane diisocyanate; and trimers thereof.

The polyoxyalkylene monoalkyl ether (a1-3) is represented by General Formula (1).

(In the formula, $R^1$ is an alkyl group, $R^2$ is an alkylene group, and n is an integer of 1 or more.)

As the polyoxyalkylene monoalkyl ether (a1-3), in view of further improvement of the storage stability, $R^1$ in General Formula (1) is preferably a methyl group, an ethyl group, a propyl group, or a butyl group, and more preferably a methyl group.

In view of improving the storage stability and fiber sizing properties, $R^2$ in General Formula (1) is preferably an ethylene group or a propylene group and more preferably an ethylene group.

In view of further improvement of the storage stability, fiber sizing properties, and the strength of an obtained molded article, n in General Formula (1) is preferably an integer of 5 to 150 and more preferably an integer of 5 to 100.

In view of further improvement of the storage stability, the polyoxyalkylene monoalkyl ether (a1-3) preferably has a hydroxyl number in the range of 10 to 200 and more preferably in the range of 15 to 200.

In view of further improvement of the storage stability and fiber sizing properties, as the polyoxyalkylene monoalkyl ether (a1-3), polyoxyethylene monoalkyl ether is more preferably used, and polyoxyethylene monomethyl ether is particularly preferably used.

As the polyol (a1-4), for example, polyether polyol, polycarbonate polyol, polyester polyol, ethylene glycol, 1,2-propanediol, 1,3-butanediol, 1,4-butanediol, 3-methyl-1,5-pentanediol, 1,6-hexanediol, 1,4-cyclohexanedimethanol, neopentyl glycol, diethylene glycol, dipropylene glycol, glycerin, trimethylolpropane, acrylic polyol obtained by introducing a hydroxyl group into an acrylic copolymer, polybutadiene polyol which is a butadiene copolymer having a hydroxyl group in a molecule, hydrogenated polybutadiene polyol, and a partially saponified ethylene-vinyl acetate copolymer can be used.

As the polyether polyol, for example, polyether polyol obtained by addition polymerization of alkylene oxide with one or more kinds of compounds having two or more active hydrogen atoms as an initiator can be used.

As the polycarbonate polyol, for example, polycarbonate polyol obtained by causing carbonate ester and polyol to react with each other, and polycarbonate polyol obtained by reaction with phosgene, bisphenol A, and the like can be used.

As the polyester polyol, polyester polyol obtained by esterification of low molecular weight polyol and polycarboxylic acid, polyester obtained by ring-opening polymerization reaction of a cyclic ester compound such as ε-caprolactone or γ-butyrolactone, and copolyesters thereof can be used.

The number average molecular weight of the polyether polyol, the polycarbonate polyol, and the aliphatic polyester polyol is preferably 300 to 4,000 and more preferably 500 to 2,000.

As the chain extender (a1-5), polyamine, other compounds having an active hydrogen atom, and the like can be used.

Examples of the polyamine include diamines such as ethylenediamine, 1,2-propanediamine, 1,6-hexamethylenediamine, piperazine, 2,5-dimethylpiperazine, isophoronediamine, 4,4'-dicyclohexylmethanediamine, 3,3'-dimethyl-4,4'-dicyclohexylmethanediamine, and 1,4-cyclohexanediamine; N-hydroxymethylaminoethylamine, N-hydroxyethylaminoethylamine, N-hydroxypropylaminopropylamine, N-ethylaminoethylamine, and N-methylaminopropylamine; diethylenetriamine, dipropylenetriamine, triethylenetetramine; hydrazine, N,N'-dimethylhydrazine, 1,6-hexamethylenebishydrazine; succinic acid dihydrazide, adipic acid dihydrazide, glutaric acid dihydrazide, sebacic acid dihydrazide, isophthalic acid dihydrazide; β-semicarbazide propionic acid hydrazide, 3-semicarbazide propylcarbazate, and semicarbazide-3-semicarbazide methyl-3,5,5-trimethylcyclohexane can be used.

As the other active hydrogen-containing compounds, for example, a glycol compound such as ethylene glycol, diethylene glycol, triethylene glycol, propylene glycol, 1,3-propanediol, 1,3-butanediol, 1,4-butanediol, hexamethylene glycol, saccharose, methylene glycol, glycerin, and sorbitol; and a phenol compound such as bisphenol A, 4,4'-dihydroxydiphenyl, 4,4'-dihydroxydiphenyl ether, 4,4'-dihydroxydiphenyl sulfone, hydrogenated bisphenol A, and hydroquinone, and water can be used.

The chain extender (a1-5) is preferably used, for example, in the range that the equivalent ratio of an amino group and an excess isocyanate group included in polyamine is 1.9 or less (equivalent ratio), and more preferably used in the range that the equivalent ratio thereof is 0.3 to 1.0 (equivalent ratio).

The urethanization reaction can be performed in the absence of a catalyst, but a known catalyst, for example, a tin compound such as stannous octylate, dibutyltin dilaurate, dibutyltin dimaleate, dibutyltin diphthalate, dibutyltin dimethoxide, dibutyltin diacetylacetate, and dibutyl tin diversate, a titanate compound such as tetrabutyl titanate, tetraisopropyl titanate, and triethanolamine titanate, and additionally, a tertiary amine compound, and a quaternary ammonium salt may be used.

The fiber sizing agent of the present invention contains the vinyl ester resin (A) and an aqueous medium. In view of obtaining a molded article with higher strength, it is preferable to add a vinyl ester resin (B) other than the vinyl ester resin (A).

The vinyl ester resin (B) can be obtained, for example, by reacting an epoxy resin with (meth)acrylic acid.

Examples of the epoxy resin include a bisphenol type epoxy resin such as a bisphenol A type epoxy resin and a bisphenol F type epoxy resin, a bisphenol fluorene type epoxy resin, a biscresol fluorene type epoxy resin, a novolak type epoxy resin such as a phenol novolak type epoxy resin, and a cresol novolak type epoxy resins, an oxodoridone-modified epoxy resin, diglycidyl ether of phenol such as brominated epoxy resins of these resins, glycidyl ether of polyhydric alcohol such as dipropylene glycol diglycidyl ether, trimethylolpropane triglycidyl ether, diglycidyl ether of alkylene oxide adducts of bisphenol A, and diglycidyl ether of hydrogenated bisphenol A, an alicyclic epoxy resin such as 3,4-epoxy-6-methylcyclohexylmethyl-3,4-epoxy-6-methylcyclo hexanecarboxylate, and 1-epoxyethyl-3,4-epoxycyclohexane, glycidyl ester such as phthalic acid diglycidyl ester, tetrahydrophthalic acid diglycidyl ester, diglycidyl-p-oxybenzoic acid, and dimer acid glycidyl ester, glycidylamine such as tetraglycidyl diaminodiphenylmethane, tetraglycidyl-m-xylenediamine, triglycidyl-p-aminophenol, and N, N-diglycidylaniline, and a heterocyclic epoxy resin such as 1,3-diglycidyl-5,5-dimethylhydantoin, and triglycidyl isocyanurate. Among these, in view of being excellent in the strength of a molded article, the handleability of a molding material, and the fluidity during molding of the molding material, a bifunctional aromatic epoxy resin is preferable, and a bisphenol A type epoxy resin and a bisphenol F type epoxy resin are more preferable. These epoxy resins can be used singly or two or more kinds thereof may be used in combination.

In view of further improvement of the strength of the obtained molded article, the content of the vinyl ester resin (B) is preferably in the range of 2% to 60% by mass and more preferably 5% to 40% by mass in the solid content of the fiber sizing agent of the present invention.

Examples of the aqueous medium include water, an organic solvent miscible with water, and a mixture thereof. Examples of the organic solvent miscible with water include an alcohol compound such as methanol, ethanol, and isopropanol; a ketone compound such as acetone and methyl ethyl ketone; a polyalkylene glycol compound such as ethylene glycol, diethylene glycol, and propylene glycol; an alkyl ether compound of polyalkylene glycol; and a lactam compound such as N-methyl-2-pyrrolidone. In the present invention, only water may be used, a mixture of water and an organic solvent miscible with water may be used, or an organic solvent miscible with water alone may be used. In view of the safety and the load on the environment, water alone or a mixture of water and an organic solvent miscible with water is preferable, and water alone is particularly preferable.

The fiber sizing agent of the present invention contains the vinyl ester resin (A) and an aqueous medium, and it is preferable that the vinyl ester resin (A) is an aqueous dispersion dispersed in an aqueous medium.

The fiber sizing agent of the present invention can be obtained, for example, by mixing and stirring a mixed solution of the vinyl ester resin (A) and the vinyl ester resin (B) and an emulsifier, then mixing the mixture and the aqueous medium, and if necessary, removing the solvent.

Examples of the emulsifier include polyoxyalkylene alkyl ether, polyoxyalkylene phenyl ether, polyoxyalkylene alkyl phenyl ether, polyoxyalkylene benzyl phenyl ether, polyoxyalkylene styryl phenyl ether, polyoxyalkylene cumyl phenyl ether, polyoxyalkylene naphthyl phenyl ether, polyoxyalkylene fatty acid ester, a polyoxyethylene-polyoxypropylene block copolymer, and polyethylene glycol. Among these, in view of further improvement of the strength of the obtained molded article, polyoxyalkylene alkyl ether, polyoxyalkylene styryl phenyl ether, and a polyoxyethylene-polyoxypropylene block copolymer are preferable, and polyoxyalkylene alkyl ether and polyoxyalkylene styryl phenyl ether are more preferable. These emulsifiers can be used singly or two or more kinds thereof may be used in combination.

Examples of the polyoxyalkylene alkyl ether include polyoxyethylene alkyl ether such as polyoxyethylene hexyl ether, polyoxyethylene octyl ether, polyoxyethylene nonyl ether, polyoxyethylene lauryl ether, polyoxyethylene stearyl ether, and polyoxyethylene eicosyl ether; and alkyl ether of a polyoxyethylene-polyoxypropylene copolymer such as hexyl ether of a polyoxyethylene-polyoxypropylene copolymer, octyl ether of a polyoxyethylene-polyoxypropylene copolymer, nonyl ether of a polyoxyethylene-polyoxypropylene copolymer, lauryl ether of a polyoxyethylene-polyoxypropylene copolymer, stearyl ether of a polyoxyethylene-polyoxypropylene copolymer, and eicosyl ether of a polyoxyethylene-polyoxypropylene copolymer. Among these, in view of the improvement of the emulsifiability, an alkyl group having 8 to 18 carbon atoms such as polyoxyethylene octyl ether, polyoxyethylene nonyl ether, polyoxyethylene lauryl ether, and polyoxyethylene stearyl ether is particularly preferable. These polyoxyalkylene alkyl ether can be used singly or two or more kinds thereof may be used in combination.

Examples of the polyoxyalkylene styryl phenyl ether include polyoxyethylene styryl phenyl ether having 1 to 3 moles of styrene added such as polyoxyethylene monostyryl phenyl ether, polyoxyethylene distyryl phenyl ether, and polyoxyethylene tristyryl phenyl ether, and styryl phenyl ether of a polyoxyethylene-polyoxypropylene copolymer having 1 to 3 moles of styrene added. In view of the improvement of the emulsifiability, polyoxyethylene styryl phenyl ether having 1 to 3 moles of styrene added is preferable. These polyoxyalkylene styryl ether can be used singly or two or more kinds thereof may be used in combination.

In view of the improvement of the emulsifiability, an average molecular weight of the polyoxyethylene-polyoxypropylene block copolymer is preferably in the range of 1,000 to 30,000 and more preferably in the range of 5,000 to 20,000. The content of polyoxyethylene is preferably in the range of 40% to 90% by mass and more preferably in the range of 50% to 80% by mass.

In view of the further improvement of the storage stability and coating workability, the mass ratio of the aqueous medium in the fiber sizing agent of the present invention is preferably in the range of 10% to 98% by mass and more preferably 20% to 90% by mass.

In view of the further improvement of the storage stability and coating workability, the mass ratio of the solid content in the fiber sizing agent of the present invention is preferably in the range of 2% to 80% by mass and more preferably in the range of 10% to 70% by mass.

As the fiber sizing agent of the present invention, if necessary, additives such as a silane coupling agent, a curing catalyst, a lubricant, a filler, a thixotropic agent, a viscosity imparting agent, wax, a heat stabilizer, a light stabilizer, a fluorescent brightening agent, and a foaming agent, a pH adjuster, a leveling agent, an anti-gelling agent, a dispersion stabilizer, an antioxidant, a radical scavenger, a heat resistance imparting agent, an inorganic filler, an organic filler, a plasticizer, a reinforcing agent, a catalyst, an antibacterial agent, an antifungal agent, a rust inhibitor, a thermoplastic resin, a thermosetting resin, a pigment, a dye, a conductivity imparting agent, an antistatic agent, a moisture permeability improver, a water repellent agent, an oil repellent agent, a hollow foaming body, a crystal water-containing compound, a flame retardant, a water absorbing agent, a moisture absorbent, a deodorant, a foam stabilizer, an antifoaming agent, an antibacterial agent, a preservative, an algae inhibitor, a pigment dispersing agent, an antiblocking agent, and a hydrolysis inhibitor can be used in combination.

Particularly, when the fiber sizing agent of the present invention is used as a glass fiber sizing agent, it is preferable to use a silane coupling agent in combination in order to further improve the adhesive strength of the sizing agent to the glass fiber.

As the silane coupling agent, for example, γ-(2-aminoethyl) aminopropyltrimethoxysilane, γ-(2-hydroxyethyl) aminopropyltrimethoxysilane, γ-(2-aminoethyl) aminopropyltriethoxysilane, γ-(2-hydroxyethyl) aminopropyltriethoxysilane, γ-(2-aminoethyl) aminopropylmethyldimethoxysilane, aminopropylmethyldimethoxysilane, γ-(2-aminoethyl) aminopropylmethyldiethoxysilane, γ-(2-hydroxyethyl) aminopropylmethyldimethoxysilane, γ-(2-hydroxyethyl) aminopropylmethyldiethoxysilane or γ-(N,N-di-2-hydroxyethyl) aminopropyltriethoxysilane, γ-aminopropyltrimethoxysilane, γ-aminopropyltriethoxysilane, γ-aminopropylmethyldimethoxysilane, γ-aminopropylmethyldiethoxysilane, or γ-(N-phenyl) aminopropyltrimethoxysilane, γ-mercaptopropyltrimethoxysilane, and γ-mercaptophenyltrimethoxysilane can be used.

The silane coupling agent is preferably used in the range of 1 to 30 parts by mass with respect to a total of 100 parts by mass of the resin components in the fiber sizing agent.

The fiber sizing agent of the present invention can also be used in combination with, for example, vinyl acetate-based, ethylene vinyl acetate-based, acrylic, epoxy-based, urethane-based, polyester-based, and polyamide-based emulsions; styrene-butadiene-based, acrylonitrile-butadiene-based, and acrylic butadiene-based latexes, or a water soluble resin such as poval or cellulose.

The fiber sizing agent of the present invention, for example, can be used for sizing or surface-treating a plurality of fibers for the purpose of preventing thread breakage or fluffing of glass fibers, carbon fibers, or the like.

Examples of the fiber material that can be treated by using the fiber sizing agent of the present invention include glass fibers, carbon fibers, silicon carbide fibers, pulp, hemp, cotton, nylon, polyester, acryl, polyurethane, polyimide, and polyamide fibers made of aramid such as Kevlar or Nomex. Among these, glass fibers and carbon fibers are preferably used because of the high strength thereof.

As the glass fiber that can be treated by using the fiber sizing agent, for example, glass fibers obtained using alkali-containing glass, low alkali glass, alkali-free glass, or the like, as a raw material, can be used. It is particularly preferable to use an alkali-free glass (E glass) that is less deteriorated with time and has stable mechanical properties.

As carbon fibers that can be treated by using the fiber sizing agent, polyacrylonitrile-based and pitch-based carbon fibers can generally be used. In view of providing excellent strength, it is preferable to use polyacrylonitrile-based carbon fibers as the carbon fibers.

In view of imparting further excellent strength and the like, as the carbon fiber, it is preferable to use carbon fibers having a single yarn diameter of 0.5 to 20 μm and it is more preferable to use carbon fibers having a single yarn diameter of 2 to 15 μm.

As the carbon fiber, for example, twisted yarns, spun yarns, and yarns obtained by spinning processing or nonwoven processing can be used. As the carbon fibers, filaments, yarns, rovings, strands, chopped strands, felts, needle punches, cloths, roving cloths, milled fibers, and the like can be used.

Examples of a method of sizing the glass fiber or the carbon fiber by using the fiber sizing agent of the present invention to form a film on the surface of the glass fiber bundle or the carbon fiber bundle include a method of uniformly applying the fiber sizing agent to a fiber surface by a kiss coater method, a roller method, a dipping method, a spray method, and other known methods such as a brush. When the fiber sizing agent includes an aqueous medium or an organic solvent as a solvent, it is preferable to be heated and dried by using a heating roller, hot air, a hot plate, or the like after the application.

The deposited amount of the film formed on the surface of the fiber is preferably 0.1% to 5% by mass and more preferably 0.3% to 1.5% by mass with respect to the total mass of the bundle of fibers that are sized and surface-treated.

The fiber material of the present invention that is sized and surface-treated obtained by the above method is combined with a matrix resin or the like described below to be used as a molding material for manufacturing a molded article with high strength.

When the fiber material of the present invention is combined with a matrix resin to form a molded article or the like, the fiber material can remarkably improve the adhesiveness at the interface between the fiber and the matrix resin, and thus can improve the strength of the molded article.

As the matrix resin used in the molding material of the present invention, for example, a thermosetting resin or a thermoplastic resin can be used. As the thermosetting resin, a phenol resin, a polyimide resin, a bismaleimide resin, an unsaturated polyester resin, an epoxy resin, a vinyl ester resin, a vinyl urethane resin, and the like can be used. As the thermoplastic resin, for example, a saturated polyester resin such as polyethylene terephthalate and polybutylene terephthalate, a polyamide resin such as polypropylene, polystyrene, polycarbonate, polyphenylene sulfide, polyphenylene oxide, 6-nylon, and 6,6-nylon, an acrylonitrile-styrene copolymer, an acrylonitrile-butadiene-styrene copolymer, polyacetal, polyether imide, and polyether ether ketone can be used.

In view of obtaining a molded article having higher strength, the matrix resin is preferably a thermosetting resin and more preferably a vinyl ester resin or an unsaturated polyester resin.

The molding material of the present invention includes the fiber material and the matrix resin, and if necessary, a polymerizable monomer. For example, a molded article with high strength can be obtained by various molding methods such as a hand lay-up method, a spray-up method, an FRP lining method, a resin transfer molding method (RTM method), a resin injection method (RI method), a vacuum assisted resin transfer molding method (VARTM method), an infusion molding method, a press molding method, an autoclave molding method, a filament winding method, and a pultrusion molding method. For example, prepreg or sheet molding compound (SMC)-shaped molding materials can be used in the molding.

For example, the prepreg can be manufactured by applying the matrix resin on a release paper, placing a fiber material subjected to surface treatment on the application surface, and pressing and impregnating the fiber material by using a roller or the like, if necessary.

In order to manufacture the prepreg, as the matrix resin, a bisphenol A type epoxy resin, a glycidylamine type epoxy resin such as tetraglycidylaminodiphenylmethane, an epoxy resin such as a novolak type epoxy resin, a vinyl ester resin, and the like are preferably used.

The sheet molding compound, for example, can be manufactured by sufficiently impregnating the surface-treated fiber material with a mixture of the matrix resin and a polymerizable unsaturated monomer such as styrene and processing the fiber material into a sheet shape. In order to manufacture the sheet molding compound, it is preferable to use an unsaturated polyester resin, a vinyl ester resin, and the like, as the matrix resin.

The curing of the molding material proceeds, for example, by radical polymerization by heating or light irradiation under pressure or normal pressure. In such a case, a known thermosetting agent, a photocuring agent, or the like can be used in combination.

Examples of the molding material include molding materials obtained by kneading the thermoplastic resin and the surface-treated fiber material with heating. The molding material can be used for secondary processing by, for example, an injection molding method.

The prepreg formed of a thermoplastic resin can be manufactured, for example, by placing the surface-treated fiber material in a sheet shape and impregnating the molten thermoplastic resin.

The prepreg formed of a thermoplastic resin can be used, for example, for secondary processing of laminating one or more sheets, then heating and molding under pressure or normal pressure, and the like.

The molded article obtained using the molding material has high strength and thus can be used, for example, for an automobile member, an aircraft member, a windmill member, and an industrial member.

EXAMPLES

Hereinafter, the present invention is more specifically described with reference to examples. The average molecular weight of the resin is measured under the following GPC measurement conditions.

[GPC Measurement Conditions]
Measurement device: High speed GPC device ("HLC-8220GPC" manufactured by Tosoh Corporation)
Column: The following columns manufactured by Tosoh Corporation were connected in series.
"TSKgel G5000" (7.8 mmI.D.×30 cm)×1
"TSKgel G4000" (7.8 mmI.D.×30 cm)×1
"TSKgel G3000" (7.8 mmI.D.×30 cm)×1
"TSKgel G2000" (7.8 mmI.D.×30 cm)×1
Detector: RI (differential refractometer)
Column temperature: 40° C.
Eluent: Tetrahydrofuran (THF)
Flow rate: 1.0 mL/min
Injection volume: 100 μL (tetrahydrofuran solution having sample concentration of 4 mg/mL)
Standard sample: A calibration curve was prepared using the following monodispersed polystyrene.
(Monodispersed Polystyrene)
"TSKgel standard polystyrene A-500" manufactured by Tosoh Corporation
"TSKgel standard polystyrene A-1000" manufactured by Tosoh Corporation
"TSKgel standard polystyrene A-2500" manufactured by Tosoh Corporation
"TSKgel standard polystyrene A-5000" manufactured by Tosoh Corporation
"TSKgel standard polystyrene F-1" manufactured by Tosoh Corporation
"TSKgel standard polystyrene F-2" manufactured by Tosoh Corporation
"TSKgel standard polystyrene F-4" manufactured by Tosoh Corporation
"TSKgel standard polystyrene F-10" manufactured by Tosoh Corporation "TSKgel standard polystyrene F-20" manufactured by Tosoh Corporation "TSKgel standard polystyrene F-40" manufactured by Tosoh Corporation "TSKgel standard polystyrene F-80" manufactured by Tosoh Corporation "TSKgel standard polystyrene F-128" manufactured by Tosoh Corporation "TSKgel standard polystyrene F-288" manufactured by Tosoh Corporation "TSKgel standard polystyrene F-550" manufactured by Tosoh Corporation Synthesis Example 1: Synthesis of Vinyl Ester Resin (B-2)

620 parts by mass of a phenol novolak-type epoxy resin ("EPICLON N-740-80M" manufactured by DIC Corporation, solid content epoxy equivalent: 180 g/equivalent, Active ingredient: 80%), 205 parts by mass of acrylic acid, 1 part by mass of t-butylhydroquinone, 10 parts by mass of 2-methylimidazole were introduced into a four-necked flask equipped with a thermometer, a stirrer, a reflux condenser, and a dropping device, and were sufficiently dissolved with stirring at 40° C. Thereafter, the temperature was raised to 75° C. to 80° C. under a gas flow in which nitrogen and air were mixed 1:1. When the reaction was performed at 75° C. to 80° C. for 10 hours, the acid value became 1 (mgKOH/g) or less, so the reaction was completed to obtain a vinyl ester resin (B-2).

(Example 1: Manufacturing and Evaluation of Fiber Sizing Agent (1))

124 parts by mass of polyoxyethylene monoethyl ether ("UNIOX M-550" manufactured by NOF Corporation, hydroxyl number: 100), 99 parts by mass of a bisphenol A type epoxy resin ("EPICLON 1050" manufactured by DIC Corporation, epoxy equivalent: 477 g/equivalent), and 65 parts by mass of methyl ethyl ketone were introduced into a four-necked flask equipped with a thermometer, a stirrer, a reflux condenser, and a dropping device, and were sufficiently dissolved with stirring at 40° C. 38 parts by mass of tolylene diisocyanate was added at 40° C. and reaction was performed for six hours at 60° C. to 65° C., to find the disappearance of the characteristic peak of NCO at 2,260 $cm^{-1}$ by an infrared absorption spectrum. Thereafter, the mixture was cooled to 40° C., 15 parts by mass of acrylic acid, 1 part by mass of t-butylhydroquinone, and 3 parts by mass of 2-methylimidazole were introduced, and the temperature was raised to 75° C. to 80° C. under a gas flow in which nitrogen and air were mixed 1:1. When the reaction was performed at 75° C. to 80° C. for 10 hours, the acid value became 1 (mgKOH/g) or less, so the reaction was completed to obtain a vinyl ester resin (A-1). The weight average molecular weight of the vinyl ester resin (A-1) was 13,000.

The mixture was cooled to 40° C., and 27 parts by mass of polyoxyethylene distyrenated phenyl ether ("EMULGEN A-500" manufactured by Kao Corporation) was added and sufficiently stirred. 850 parts by mass of ion exchanged water was dropwise added over 30 minutes, and the mixture was further stirred and mixed for 15 minutes. This aqueous dispersion was concentrated by distillation under reduced pressure to obtain a fiber sizing agent (1) which was an aqueous dispersion of a vinyl ester resin having a non-volatile content of 30% by mass.

[Manufacturing of Carbon Fiber Bundle]

Unsized, polyacrylonitrile-derived carbon fibers (6,000 fibers having a single filament diameter of 7 μm, a strand strength of 4,400 MPa, and a modulus elasticity of 235 GPa) were bundled and then impregnated, by a dipping method, with a material obtained by diluting the fiber sizing agent (1) with ion exchanged water to a non-volatile content of 5 mass %. The bundle was then squeezed with a roller to adjust the deposited amount of the active ingredient to 1% by mass, and then the heat treatment was performed at 150° C. for 30 minutes to obtain a carbon fiber bundle (1), which had been surface-treated with the fiber sizing agent (1).

[Evaluation of Fiber Sizing Properties]

The carbon fiber bundle (1) was rubbed 1,000 times (reciprocating speed of 300 times/minute) with a tension of 50 g through three mirror-plated chrome-plated stainless needles arranged in a zigzag way by using a TM-type friction conjugation force tester TM-200 (manufactured by Daiei Kagaku Seiki MFG. Co., Ltd.), and the fluffing state of the carbon fiber bundle (1) was visually determined according to the following criteria.

A: Fluffing was not observed at all as before rubbing.

B: Although some fluffing was observed, there was no problem in practice.

C: Fluffing was found and some thread breakage was also seen.

D: A large amount of fluffing and a large number of broken filaments were observed.

a lot of thread breakage of single yarns were found.

[Manufacturing of Carbon Fiber Cloth]

At room temperature, a cloth having a size of about 300 mm×300 mm obtained by cutting a carbon fiber cloth (a polyacrylonitrile-based carbon fiber cloth having a fabric weight of 200 g/m², a single yarn diameter of 7 μm, a strand strength of 4,400 MPa, and a modulus of elasticity of 235 GPa, which was subjected to a sizing treatment (surface treatment)) was immersed in acetone having a mass of about 30 times the parts by mass of the cloth and was left for 12 hours. After the immersion, the cloth was dried for two hours by using a dryer at 80° C. to remove a resin component adhering to the surface of the carbon fiber to obtain the carbon fiber cloth that was not subjected to a sizing treatment (surface treatment).

The carbon fiber cloth is impregnated with a fiber sizing agent (1) diluted with ion exchanged water to a non-volatile content of 5% by mass so that the deposited amount of the solid content was 1% by mass, and a drying treatment was performed at 150° C. for 30 minutes by using a dryer to obtain a carbon fiber cloth (1).

[Manufacturing of Molded Article]

A mixture obtained by mixing 0.5 parts by mass of 6% by mass cobalt naphthenate and 1.0 part by mass of methyl ethyl ketone peroxide ("PERMEK N" manufactured by NOF Corporation) with 100 parts by mass of a vinyl ester resin solution ("EXDHOMA 9102-01NP" manufactured by DIC Material Inc.) was poured on a glass plate of 350 mm×350 mm which was subjected to a release treatment, the carbon fiber cloth (1) obtained above was placed thereon, lamination was performed by a hand lay-up molding method (8 ply), curing was performed at room temperature (25° C.) for 12 hours, and curing was further performed at 60° C. for three hours, to obtain a molded article (1) which was carbon fiber reinforced plastic (carbon fiber content: 50% by volume).

[Evaluation of Bending Strength of Molded Article]

With respect to the molded article (1) obtained above, the measurement was performed according to JIS K 7181 by using a test piece having a width of 15 mm, a length of 100 mm, and a thickness of 2 mm.

[Evaluation of Compression Strength of Molded Article]

With respect to the molded article (1) obtained above, the measurement was performed according to JIS K 7074 by using a dumbbell test piece having a width of 13 mm, a length of 77 mm, and a thickness of 2 mm.

[Evaluation of Interlaminar Shear Strength of Molded Article]

With respect to the molded article (1) obtained above, the measurement was performed according to JIS K 7078 by using a test piece having a width of 10 mm, a length of 15 mm, and a thickness of 2 mm.

(Example 2: Manufacturing and Evaluation of Fiber Sizing Agent (2))

81 parts by mass of polyethylene glycol (number of moles of ethylene oxide added: 12), 30 parts by mass of polyoxyethylene monoethyl ether ("UNIOX M-550" manufactured by NOF Corporation, hydroxyl number: 100), and 64 parts by mass of methyl ethyl ketone were added to a four-necked flask equipped with a thermometer, a stirrer, a reflux condenser, and a dropping device, and were sufficiently dissolved with stirring at 40° C. 47 parts by mass of tolylene diisocyanate was added at 40° C. and reaction was performed at 75° C. for two hours. 97 parts by mass of a bisphenol A type epoxy resin ("EPICLON 1050" manufactured by DIC Corporation, epoxy equivalent: 477 g/equivalent) was reacted at 60° C. to 65° C. for 6 hours, to find the disappearance of the characteristic peak of NCO at 2,260 $cm^{-1}$ by an infrared absorption spectrum. Thereafter, the mixture was cooled to 40° C., 15 parts by mass of acrylic acid, 1 part by mass of t-butylhydroquinone, and 3 parts by mass of 2-methylimidazole were introduced, and the temperature was raised to 75° C. to 80° C. under a gas flow in which nitrogen and air were mixed 1:1. When the reaction was performed at 75° C. to 80° C. for 10 hours, the acid value became 1 (mgKOH/g) or less, so the reaction was completed to obtain a vinyl ester resin (A-2). The weight average molecular weight of the vinyl ester resin (A-2) was 13,500.

The mixture was cooled to 40° C., and 27 parts by mass of polyoxyethylene distyrenated phenyl ether ("EMULGEN A-500" manufactured by Kao Corporation) was added and sufficiently stirred. 850 parts by mass of ion exchanged water was dropwise added over 30 minutes, and the mixture was further stirred and mixed for 15 minutes. This aqueous dispersion was concentrated by distillation under reduced pressure to obtain a fiber sizing agent (2) which was an aqueous dispersion of a vinyl ester resin having a non-volatile content of 30% by mass.

A carbon fiber bundle (2) and a molded article (2) were manufactured in the same manner as in Example 1 except that the fiber sizing agent (1) used in Example 1 was changed to the fiber sizing agent (2), and various evaluations were performed.

(Example 3: Manufacturing of Fiber Sizing Agent (3))

274 parts by mass of the vinyl ester resin (A-1) obtained in Example 1 was added to a four-necked flask equipped with a thermometer, a stirrer, a reflux condenser, and a dropping device, the temperature was adjusted to 40° C., 115 parts by mass of a bisphenol A type epoxy acrylate resin ("UNIDIC V-5500" manufactured by DIC Corporation, active ingredient of 99% or more, hereinafter abbreviated as a vinyl ester resin (B-1)) and 20 parts by mass of polyoxyethylene distyrenated phenyl ether ("EMULGEN A-500" manufactured by Kao Corporation) were added and stirred sufficiently. 950 parts by mass of ion exchanged water was dropwise added over 30 minutes, and the mixture was further stirred and mixed for 15 minutes. This aqueous dispersion was concentrated by distillation under reduced pressure to obtain a fiber sizing agent (3) which was an aqueous dispersion of a vinyl ester resin having a non-volatile content of 30% by mass.

A carbon fiber bundle (3) and a molded article (3) were manufactured in the same manner as in Example 1 except that the fiber sizing agent (1) used in Example 1 was changed to the fiber sizing agent (3), and various evaluations were performed.

(Example 4: Manufacturing of Fiber Sizing Agent (4))

300 parts by mass of the vinyl ester resin (A-1) obtained in Example 1 was added to a four-necked flask equipped with a thermometer, a stirrer, a reflux condenser, and a dropping device, the temperature was adjusted to 40° C., and 150 parts by mass of the vinyl ester resin (B-2) obtained in Synthesis Example 1 and 21 parts by mass of polyoxyethylene distyrenated phenyl ether ("EMULGEN A-500" manufactured by Kao Corporation) were added and stirred sufficiently. 1,000 parts by mass of ion exchanged water was dropwise added over 30 minutes, and the mixture was further stirred and mixed for 15 minutes. This aqueous dispersion was concentrated by distillation under reduced pressure to obtain a fiber sizing agent (4) which was an aqueous dispersion of a vinyl ester resin having a non-volatile content of 30% by mass.

A carbon fiber bundle (4) and a molded article (4) were manufactured in the same manner as in Example 1 except that the fiber sizing agent (1) used in Example 1 was changed to the fiber sizing agent (4), and various evaluations were performed.

(Comparative Example 1: Manufacturing of Fiber Sizing Agent (R1))

149 parts by weight of glycerin dimethacrylate hexamethylene diisocyanate ("UA101H" manufactured by Kyoeisha Chemical Co., Ltd., the number of terminal unsaturated groups: 4), 16.5 parts by mass of a nonionic emulsifier (polyoxyethylene (70 mol) styrenated (5 mol) cumylphenol (mass ratio: 90:10)), and 142 parts by mass of methyl ethyl ketone were added to a four-necked flask equipped with a thermometer, a stirrer, a reflux condenser, and a dropping device, and uniformly dissolved at 50° C. Thereafter, the contents were transferred to an emulsifying tank, 166 parts by weight of polyglycerin polyglycidyl ether ("DENACOL EX-521" manufactured by Nagase ChemteX Corporation, epoxy equivalent: 183 g/equivalent, and the number of epoxy groups: 3 or more) was added, the mixture was uniformly dispersed and stirred, 3,000 parts by mass of ion exchanged water was added for 10 minutes under forcibly stirring with a homomixer, and the mixture was forcibly emulsified. The aqueous dispersion was concentrated by distillation under reduced pressure to obtain a fiber sizing agent (R1) which was an aqueous dispersion of a resin mixture having a non-volatile content of 15% by mass.

A carbon fiber bundle (R1) and a molded article (R1) were manufactured in the same manner as in Example 1 except that the fiber sizing agent (1) used in Example 1 was changed to the fiber sizing agent (R1), and various evaluations were performed.

The evaluation results of Examples 1 to 4 and Comparative Example 1 are shown in Table 1.

TABLE 1

| | | Example 1 | Example 2 | Example 3 | Example 4 | Comparative Example 1 |
|---|---|---|---|---|---|---|
| Fiber sizing agent | | (1) | (2) | (3) | (4) | (R1) |
| Resin formulation (part by mass) | Vinyl ester resin (A-1) | 100 | | 62 | 62 | |
| | Vinyl ester resin (A-2) | | 100 | | | |
| | Vinyl ester resin (B-1) | | | 38 | | |
| | Vinyl ester resin (B-2) | | | | 38 | |
| | Comparative resin mixture (1) | | | | | 100 |
| Evaluation | Fiber sizing properties | A | B | A | A | C |
| | Bending strength of molded article (MPa) | 855 | 825 | 926 | 942 | 700 |
| | Compression strength of molded article (MPa) | 307 | 282 | 338 | 343 | 205 |
| | Interlaminar shear strength of molded article (MPa) | 70 | 68 | 75 | 72 | 57 |

It was found that the fiber sizing agents of Examples 1 to 4 which are the fiber sizing agents of the present invention had excellent fiber sizing properties, and the molded articles obtained using the same had excellent strength.

Meanwhile, Comparative Example 1 is an example using an aliphatic epoxy compound and a compound including a terminal unsaturated group and a polar group in one molecule, but it was found that fiber sizing properties were insufficient, and the strength of the molded article that can be obtained by using the same was insufficient.

The invention claimed is:

1. A fiber sizing agent comprising:
    a vinyl ester resin (A) having an alkoxy polyoxyalkylene structure and a urethane bond; and
    an aqueous medium,
    wherein the vinyl ester resin (A) has a (meth)acryloyl group, and (meth)acryloyl equivalent of the vinyl ester resin (A) is in a range of 500 to 3,000 g/equivalent.

2. The fiber sizing agent according to claim 1,
    wherein the vinyl ester resin (A) has a structure derived from a bisphenol A epoxy resin.

3. The fiber sizing agent according to claim 2, further comprising:
    a vinyl ester resin (B) other than the vinyl ester resin (A).

4. The fiber sizing agent according to claim 1, further comprising:
    a vinyl ester resin (B) other than the vinyl ester resin (A).

5. A fiber material comprising:
    the fiber sizing agent according to claim 1.

6. A molding material comprising:
    the fiber material according to claim 5; and
    a thermosetting resin.

7. A molded article comprising a cured product of the molding material according to claim 6.

8. A molded article comprising the fiber sizing agent according to claim 1.

* * * * *